United States Patent [19]

Peterson

[11] Patent Number: 4,864,443
[45] Date of Patent: Sep. 5, 1989

[54] DISC CLAMPING DEVICE

[75] Inventor: Miles L. Peterson, Santa Clara County, Calif.

[73] Assignee: Seagate Technology, Inc., Scotts Valley, Calif.

[21] Appl. No.: 115,716

[22] Filed: Nov. 2, 1987

[51] Int. Cl.⁴ .......................................... G11B 17/028
[52] U.S. Cl. .................................................. 360/99.12
[58] Field of Search .............................. 360/97, 98, 99; 369/270

[56] References Cited

U.S. PATENT DOCUMENTS 3,838,460  9/1974  Stewart .................................. 360/97
3,849,800  11/1974 Cuzner et al. ........................ 360/97
4,249,221  2/1981  Cox et al. ............................. 360/97

Primary Examiner—Robert S. Tupper
Attorney, Agent, or Firm—Flehr, Hohbach, Test, Albritton & Herbert

[57] ABSTRACT

A disc clamping device having a spindle for rotating a disc, and a hub on top of the spindle with a flat, flared surface for supporting the disc. A cylindrical section, with an annular groove interrupted by inward recesses, is located above the flared surface. A wave washer with inwardly extending tabs is placed on the hub by aligning the inwardly extending tabs with the recesses in the annular groove. The washer is rotated to capture the tabs in the groove thereby compressing the washer against the disc.

10 Claims, 3 Drawing Sheets

DISC CLAMPING DEVICE

CROSS REFERENCE TO RELATED APPLICATION

This invention is useful in disc drives of the type disclosed in U.S. application Ser. No. 914,690, filed Oct. 2, 1986, and assigned to the Assignee of this invention. Details of a spindle motor are disclosed in application Ser. No. 116,044 filed Nov. 2, 1987 in the name of McLeod and Peterson, entitled "MAGNETIC RETURN PATH," filed simultaneously herewith, and assigned to the Assignee of this invention. Both applications are incorporated herein by reference.

FIELD OF THE INVENTION

This invention is directed generally to the field of disc drives and more particularly to improved means for clamping the discs to the spindle motor hub and drive shaft.

BACKGROUND OF THE INVENTION

In many data storage applications, there is a requirement for a disc drive having a high storage capacity within a small physical envelope. To satisfy this, Winchester type disc drives have come into common use. Such drives enclose one or more hard discs in a sealed enclosure of the type disclosed in the above 690 patent application.

In such disc drives, where a high storage capacity is contained within a limited space, it is important to provide a system in which the discs and read/write head assemblies remain precisely aligned so that the data can be reliably accessed. That is, the disc or discs must be tightly clamped to the upright hub of the spindle motor in a precise perpendicular orientation thereto. Such alignment requires precise machining of the spindle hub and that substantial clamping forces be exerted on the disc.

The problem is compounded by the current move to $3\frac{1}{2}$" disc drives. Since the available surface area for recording on the disc is being dramatically reduced, the diameter of the spindle must be minimized, as spindle shaft diameter directly subtracts from available recording surface area.

To maintain alignment, the disc must be clamped to the spindle with a considerable force. A conventional assembly method uses a single screw, screwed into the center of the shaft, to fasten a circular clamp against the disc or stack. To obtain the required clamping force without shearing the screw, this screw should be fairly large. Inserting a large screw into a minimum diameter shaft leaves a very thin spindle shaft wall adjacent the screw, providing only marginal strength in the portion of the shaft where the screw is attached.

Conventional solutions to the conflicting demands of minimizing shaft size and maximizing clamping force are (1) the use of three or six screws distributed around the periphery of the top of the hub to clamp the disc stack (the disadvantage of this approach is uneven distribution of the clamping forces over the disc, leading to potential warpage of the discs); or (2) the use of a stepped shaft with a larger diameter where the hub and single screw are placed. Unfortunately, such a stepped shaft is quite expensive to fabricate. Moreover, both of these methods involve substantially higher manufacturing and/or assembly costs than the use of a single screw in a shaft which does not have a step. Therefore, the problem to be addressed is to reliably clamp a disc in place on a motor spindle, especially in small diameter (e.g., 3.5") disc drives.

SUMMARY OF THE INVENTION

It is an objective of this invention to provide an improved disc clamping means which supplies a substantial clamping force and does not compromise the strength of the disc support components.

Another objective is to provide means for fastening a disc or discs to the hub of a spindle motor using clamping means that provides a clamping force uniformly distributed over the circular disc surface.

Yet another objective herein is to provide components for disc clamping that are inexpensive to manufacture and are suitable for simple and fast assembly methods.

A further objective herein is to provide disc clamping means using parts which need not be manufactured to tight dimensional tolerances.

These and other objectives of this invention are achieved in a disc drive including means for mounting a hard disc or discs in fixed relationship with respect to a spindle motor shaft, and means for driving the mounting means to rotate the disc. The driving means comprises a motor which is attached to a baseplate of the disc drive housing, the rotor of said motor being attached to the spindle hub which extends through the baseplate to support the disc for rotational movement. The mounting means of the invention includes a hub whose lower end has a flat surface for supporting the memory disc. Preferably, a shim comprising a flat washer rests on the disc. Then a spring washer is inserted over the top of the hub and pressed down against the shim and disc surface. The spring washer supplies a strong, evenly distributed downward bias against the top surface of the disc.

To hold the washer in place, a groove is machined in the spindle hub just below the top of the hub. Lobes are die cast around the top of the hub, and corresponding recesses are defined in the inner circumference of the spring washer. The spring washer is pressed down over the top of the hub and positioned against the shim so that it may be rotated and captured beneath the lobes. As the washer is rotated under the lobes, a cam effect increases the force against the shim and disc. When captured, the washer remains partly depressed so that a significant, balanced spring force is exerted against the disc.

DETAILED DESCRIPTION OF PREFERRED EMBODIMENT

Figure 1:
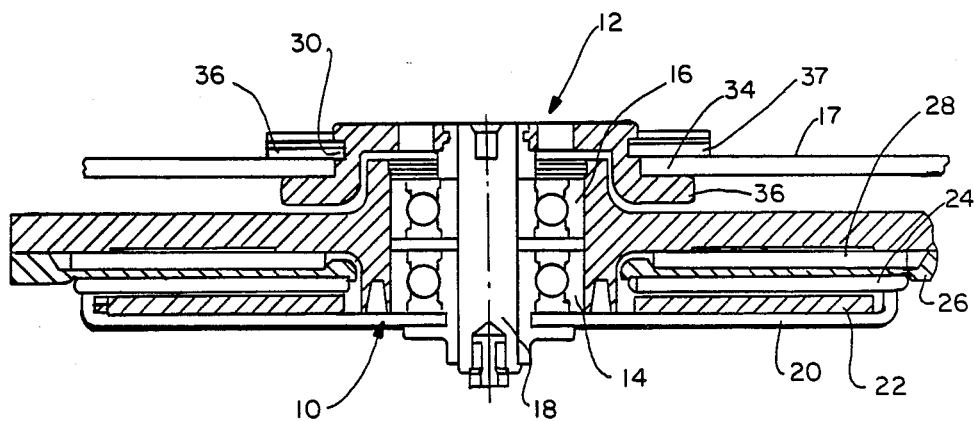
FIG. 1 is a vertical sectional view of a disc drive motor using this invention.
Figure 2:
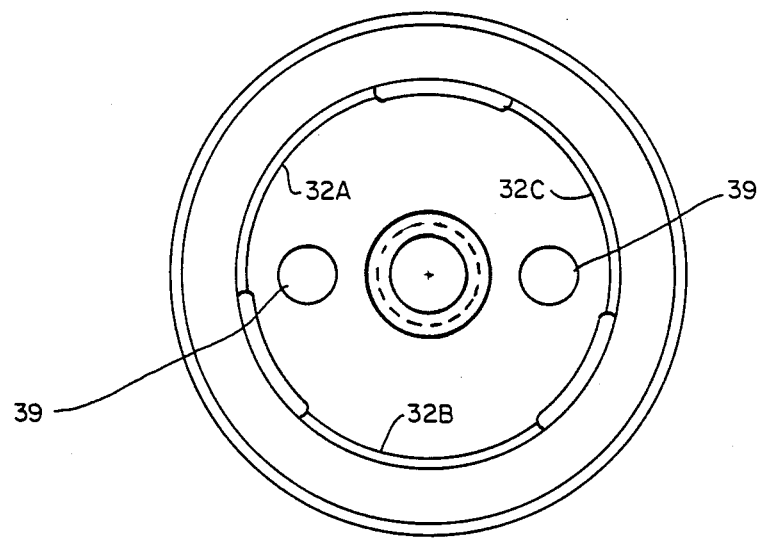
FIG. 2 is a top view of the hub used to support discs on the spindle motor.
Figure 3:
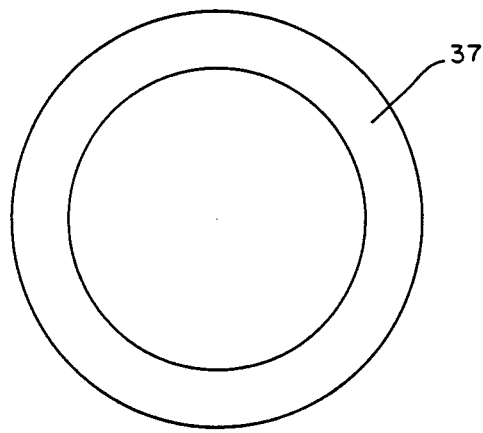
FIG. 3 is a plan view of a washer used to isolate a disc from the hub.
Figure 4A:
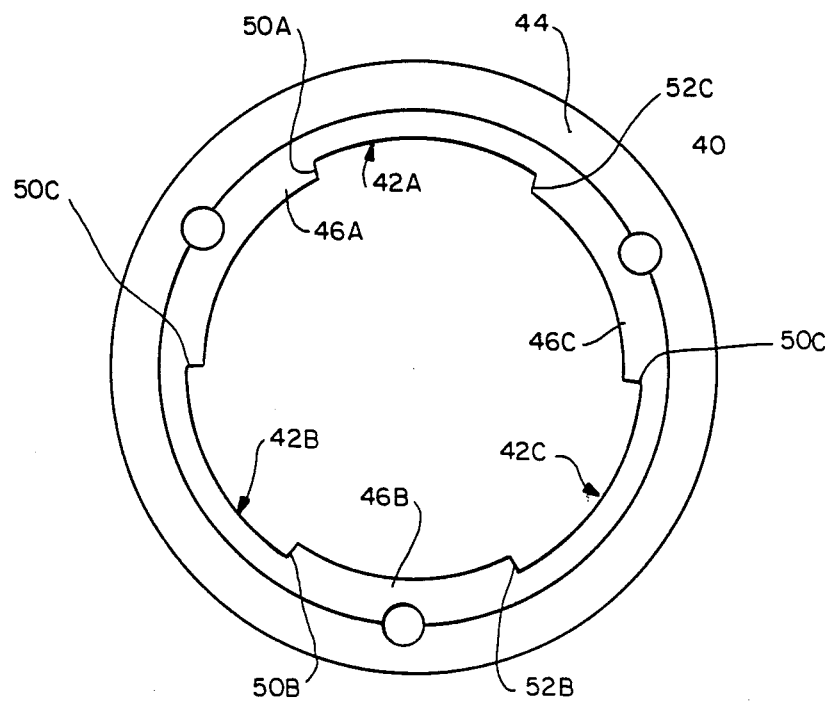
FIGS. 4A and 4B are plan and perspective views of the spring washer used to tightly clamp a disc on the rotating hub in this invention.
Figure 4B:
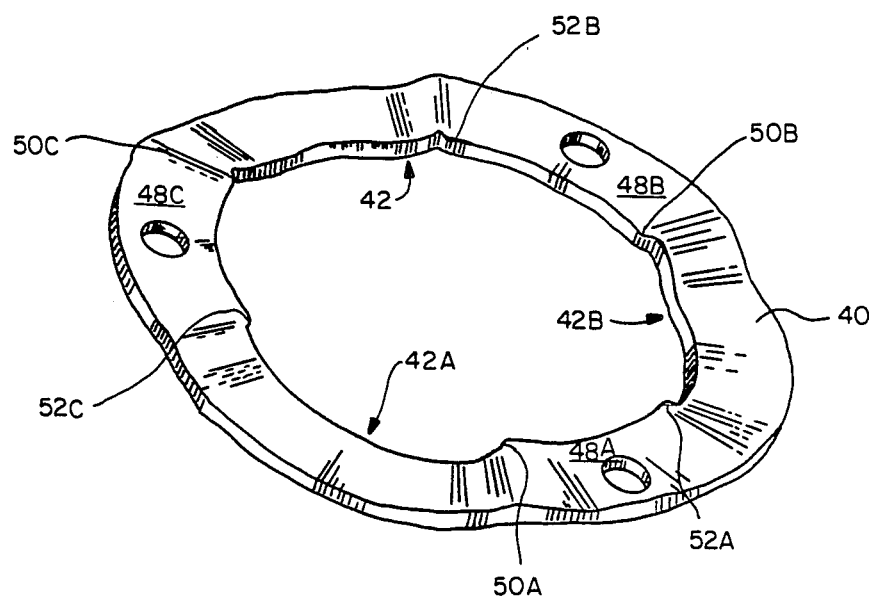

Referring to the figures, FIG. 1 is a vertical sectional view of a spindle motor 10 for rotating a hub 12 which supports at least one disc or a plurality of discs captured on the hub in a manner defined by this invention. The spindle motor 10 is a flat, brushless dc motor, details of which are disclosed in the above incorporated application. The motor 10 includes bearings 14, 16 which support a central shaft 18 for rotation. The lower end of the shaft supports a shallow cup-shaped rotor 20 carrying an axially oriented magnet 22. Facing the magnet 22 are a plurality of axial air core coils 24 mounted on a printed circuit board 26. The opposite side of the printed circuit board 26 carries a magnetic return path element 28. Selective energization of the coils 24 will cause, by way of the influence of the changing magnetic field on the axially polarized magnet 22, rotation of the rotor 20, shaft 18 and the hub 12. As a result, rotation of the disc 17 is achieved.

It is obvious that it is absolutely essential that the disc 17 be tightly clamped to the hub 12 so that there is no slippage or tilting of the disc relative to the hub 12. Even a minor dislocation of the disc relative to a horizontal plane defined by the base of the disc drive would render it difficult to accurately position a transducer over the disc surface 17 and to accurately and reliably access data on the disc drive. Because of the high volume requirement for manufacture of such disc drives, it is also essential that a method and apparatus be designed for quickly fastening the disc to the hub. It is especially desirable if this can be done without the use of screws which are easily dropped and require an excessive time for handling and tightly fastening into place. Screws also introduce contamination into the HDA, as particles are created when they are screwed and unscrewed. All these objectives are achieved by using the fastening device which is explained below with respect to FIGS. 1, 2, 3 and 4.

Specifically, the top of the hub 12 is die cast to include a groove 30 and a series of cast radially spaced lobes 32A, B, C. The hub 12 lobes 32 are cast so that the maximum radius of the top of the hub is such that a disc 17 can slide over the top of the hub and be placed on the flat surface 34 defined by the top of the flange 36 which comprises the lower extremity of the hub 12. After the disc 17 is in place, a shim 37 is placed on top of the disc. This bushing or shim 37 provided between the spring washer shown in FIG. 4 and the top surface of the disc 1 7 is used to distribute the force of the clamp over the inner surface of the disc. The clamp comprises a spring washer 40 including a plurality of recesses 42A, B, C which are equal in circumferential extent and depth to the lobes 32A-C. As a result, after the shim 37 is in place, this washer can be pressed down over the lobes 32 of the top of the hub 12 to rest against the top of the shim 37. The spring washer is then rotated. The top of the hub is held still with a two-pin tool insert in holes 39 in the hub; a three-pin tool is inserted in holes 41 of the spring washer 40 to rotate it beneath the lobes. It can be seen that because of the fact that the washer rests in the groove 30, and the radial distance 44 of the washer is sufficient, especially where inner lobes 46a, b, c are provided, that these lobes can now pass under and are captured under the hub lobes 32A-C. As a result of the vertical dimensions of the spring washer being greater than the height of the groove 30, a camming action is created as the spring washer is rotated, the high point of the spring washer existing at its inner lobes 46A-C being captured under the lobes 32A-C of the hub 12 and pressing the spring washer 40 down against the shim 37 and therefore the disc 17. As a result, a significant clamping force is provided downward against the disc 17. Preferably, each spring washer is designed so that the region 48A-C between each recess 42A-C has a ramp effect as the washer 40 is rotated under a lobe. That is, for each ramp region 48, the point 50 would be the low point and the point 52 would be the high point. As the washer 40 is turned, the ramps pass beneath the lobes and the washer is compressed, forcing the disc 17 into its desired orientation on the flange 36.

As a result of using this design, a number of advantages are achieved. In the first place, quick and reliable hand assembly of the disc 17, shim 37 and washer 40 is clearly achieved. Further, to change the clamping force against the disc, it is only necessary to change the material and conformation of the washer, or should more points of contact be desired, the number of lobes on the top of the hub can be increased. Then by increasing the number of lobes on the spring washer 40, the number of points of contact between this washer and the disc is also increased. Finally, construction of the entire hub assembly is also significantly simplified. To form the hub, one simply starts by casting the hub to define the lobes, and then groove 30 can be turned beneath these lobes to provide the resting place of the proper dimension of the spring washer. A plurality of discs could be held in place by placing spacers between each disc and this clamp over the top disc.

Other advantages of this invention may become apparent to a person of skill in the art who studies this invention disclosure. Therefore, the scope of this invention is to be limited only by the following claims.

What is claimed:

1. A disc drive including a housing base plate, a spindle motor having a spindle extending up through said base plate for rotating a disc at a constant speed, a hub on the top of said spindle for supporting a disc for rotation, said hub including a flat, flared surface for supporting a disc, and a cylindrical section above said flared surface so that said disc is slidable over said cylindrical section of said hub to rest on said flared surface, the improvement comprising an annular groove of a given height proximate the top of said cylindrical section, the upper surface of said annular groove being interrupted by recesses extending inwardly from an outer diameter of said cylindrical section to define lobes spaced around said upper surface, and a wave washer having an outer diameter sufficient to engage the upper surface of said disc as said disc rests on said flared surface, and an inner diameter substantially the same as said outer diameter of said cylindrical section, and said disc inner diameter, said washer inner diameter being interrupted by inwardly extending tabs corresponding to and appropriate for engagement with said recesses in said upper surface of said annular groove, said wave washer being placed on said hub by aligning said inwardly extending tabs with said recesses in said upper surface of said annular groove, passing said washer over the top of said hub to substantially align said washer with said groove, and rotating said washer to capture said tabs under said lobes whereby said wave washer is compressed and biased against said disc and against said lobes by the spring effect of said wave washer.

2. A disc drive as in claim 1 including a shim comprising a flat washer resting on a top surface of the disc between the disc and the wave washer to protect the surface of the disc against the wave washer and circumferentially distribute the spring bias and clamping effect of the washer.

3. A disc drive as in claim 2 wherein said wave washer has an unloaded height greater than the height from the upper surface of said groove to the upper surface of said disc, whereby when said wave washer is captured under said lobes its reduced height establishes a camming action holding the disc in place.

4. A disc drive as in claim 1 wherein each of said tabs is substantially equal in circumferential extent and depth with any one of said lobes.

5. A disc drive as in claim I wherein said tabs and said lobes are regularly spaced around said diameter.

6. A disc drive as in claim 5 wherein the wave washer has a maximum height relative to the disc on which said washer rests at said recessed portions, and a maximum height at said inwardly extending tabs, said tabs twisted out of the horizontal plane defined by upper and lower contact surfaces of the washer to connect the regions of maximum and minimum height by ramp portions, whereby said now-recessed portions are cammed beneath said lobes with rotation of said wave washer, the downward pressure created by said reduction in height defining an evenly distributed downward force against said disc to hold said disc in place on said flared surface.

7. A disc drive as in claim 6 wherein said tabs and said lobes are regularly spaced around said diameter.

8. A disc drive as in claim 1 wherein the wave washer has a maximum height relative to the disc on which said washer rests at said non-recessed portions, and a minimum height at said inwardly extending tabs, said regions of maximum and minimum height being connected by ramp portions, whereby said now-recessed portions are cammed beneath said lobes with rotation of said wave washer, the downward pressure created by said reduction in height defining an evenly distributed downward force against said disc to hold said disc in plane on said flared surface.

9. A disc drive as in claim 8 wherein each of said tabs is substantially equal in circumferential extent and depth with any one of said lobes.

10. A disc drive as in claim 9 including a shim comprising a flat washer resting on a top surface of the disc between the disc and the wave washer to protect the surface of the disc against the wave washer and distribute the spring bias and clamping effect of the washer.

* * * * *